May 1, 1923.

A. E. CARLSON

STONE DRILLING MACHINE

Filed March 30, 1922  2 Sheets-Sheet 1

1,453,620

INVENTOR.
Anthony E. Carlson,
BY
Robert D. Pearson,
ATTORNEY.

May 1, 1923.
A. E. CARLSON
STONE DRILLING MACHINE
Filed March 30, 1922
1,453,620
2 Sheets-Sheet 2
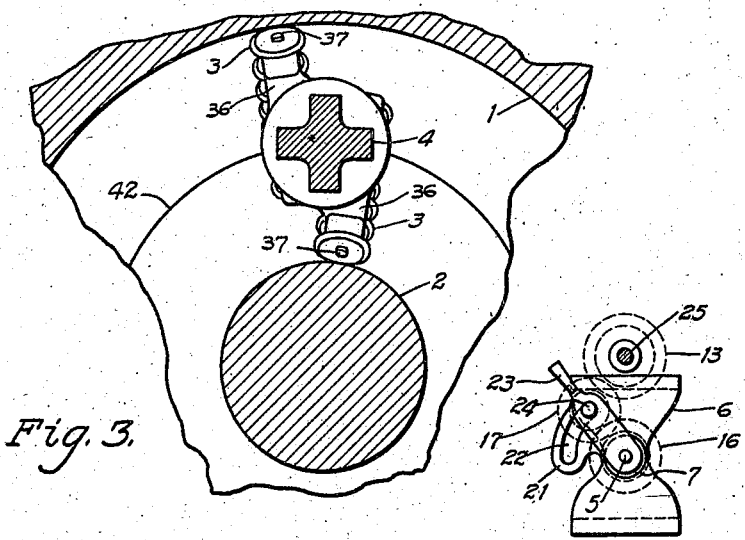
Fig. 3.
Fig. 7.
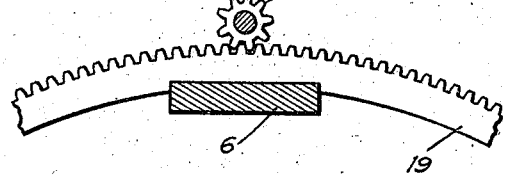
Fig. 4.
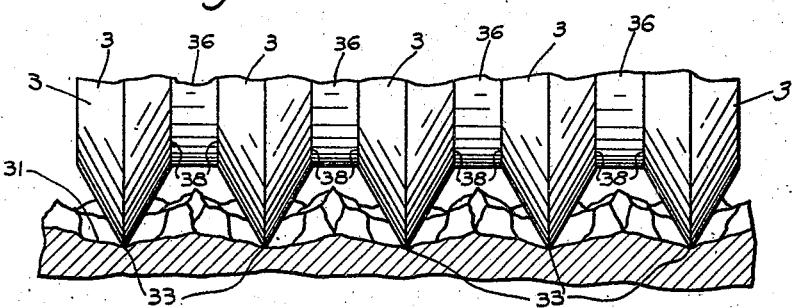
Fig. 5.
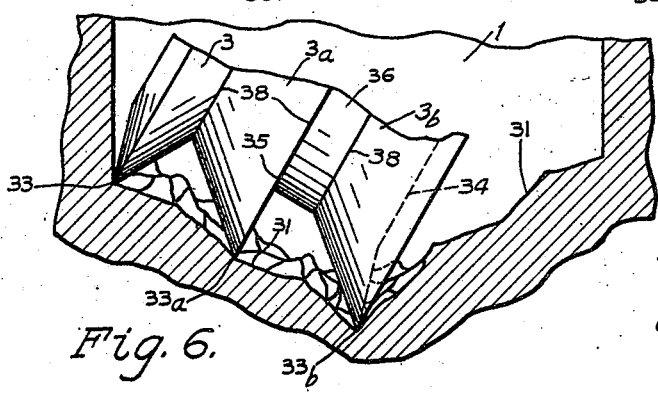
Fig. 6.
INVENTOR.
Anthony E. Carlson,
BY
Robert D. Pearson,
ATTORNEY.

Patented May 1, 1923.

1,453,620

UNITED STATES PATENT OFFICE.

ANTHONY E. CARLSON, OF LOS ANGELES, CALIFORNIA.

STONE-DRILLING MACHINE.

Application filed March 30, 1922. Serial No. 548,030.

*To all whom it may concern:*

Be it known that I, ANTHONY E. CARLSON, a citizen of the United States, residing at Los Angeles, in the county of Los Angeles and State of California, have invented certain new and useful Improvements in a Stone-Drilling Machine, of which the following is a specification.

My invention relates to a drilling machine and facing machine tool apparatus, and is directed particularly to a tunnel boring machine which may be used to drill thru stone or other hard substances.

The object of this invention is to provide a simple, compact tool which may be used in a boring or facing machine to cut thru stone, glass, or softer materials.

Another object is to provide a drilling machine that will bore tunnels, by removing a quantity of material around a central core with multiple rotary cutters.

Referring to the drawings:

Figure 3 is a part sectional view on line 3—3 of Figure 1.

Figure 4 is a fragmentary view on line 4—4 of Figure 1.

Figure 5 is a fragmentary view of the cutters, illustrating the method of breaking away the stone, glass, or other materials.

Figure 6 is a fragmentary view of another form of cutters, illustrating the method of breaking away the stone, glass, or other materials, when set in the positions shown in Figures 1 and 3.

Figure 7 is a fragmentary view on line 7—7 of Figure 1.

Figure 1:
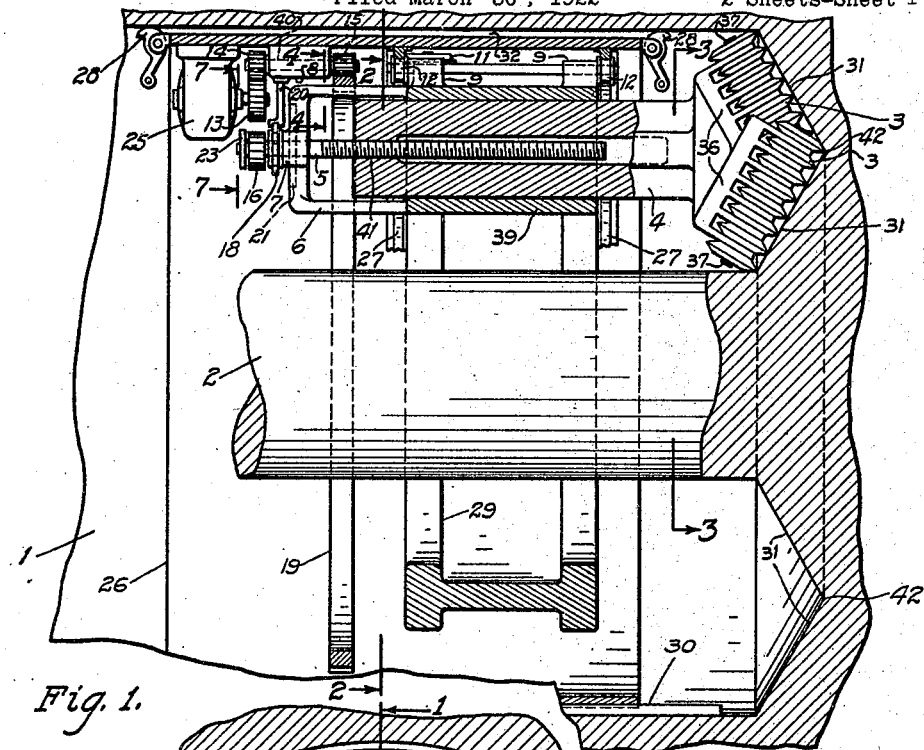
Figure 1 illustrates a device as applied to a tunnel drilling machine, in section on line 1—1 of Figure 2.
Figure 2:
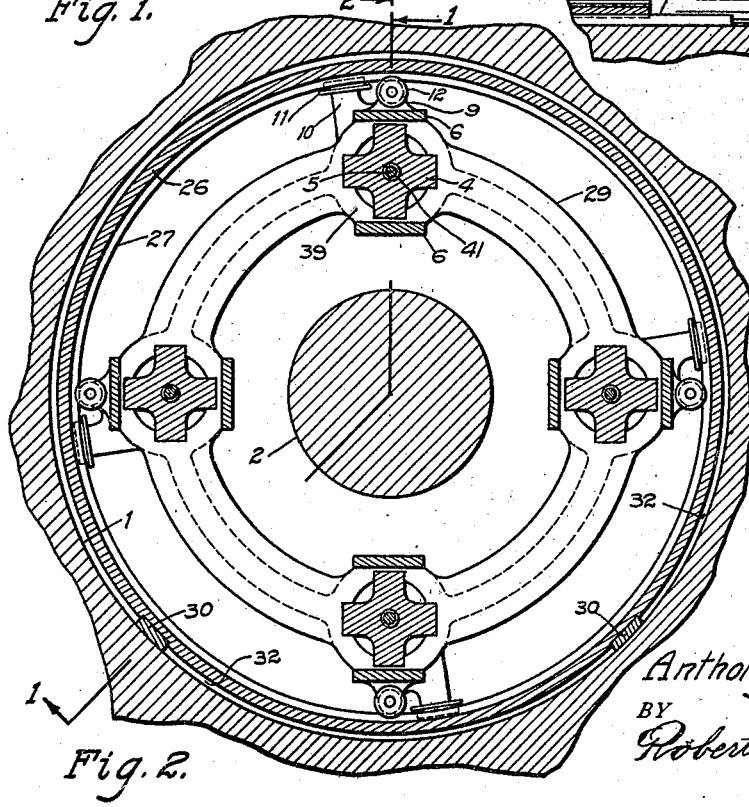
Figure 2 is a sectional view on line 2—2 of Figure 1.

Referring to the drawings in which like characters of reference designate similar parts, 1 represents a circular bore and 2 is a cylindrical core formed in the central portion thereof, and the surface 31 forms the inner portion of the said bore 1 adjacent to the core 2. The cylinder 26 is secured in the bore 1 by the clamps 28, with a space 32 therebetween, the rails 30 are positioned longitudinally between the bore 1 and the cylinder 26 within the said space 32. The cutters 3, 3ᵃ and 3ᵇ are circularly formed with edges 33, 33ᵃ and 33ᵇ integral with the outer edges thereof, and with the hollow 34, straight face 35 and bearing surfaces 38 respectively, and are arranged to bear against the said surface 31, the said cutters 3, 3ᵃ and 3ᵇ are operatively positioned on the shafts 37, and the shafts 37 are in turn secured in the arms 36, the arms 36 are secured to the outer portion of the posts 4, the posts 4 are operatively positioned in the slides 39, and the slides 39 are in turn made integral with the frame 29, the bearings 9 are integral with the frame 29 and slides 39, and operatively hold the wheels 12 on the rails 27, the bearings 10 are also integral with the frame 29 and slides 39, and operatively hold the wheels 11 on the inner side of the said rails 27. The motor 25 is secured to the inner side of the cylinder 26, the gear 13 is positioned on the motor 25 and operatively meshes with the gear 14, the gear 14 is secured to one end of the shaft 40 and the gear 15 is secured to the opposite end thereof, the said shaft 40 is operatively positioned in the bearing 8, and the bearing 8 is secured to the inner portion of the said cylinder 26 in line with the motor 25, the gear 15 is operatively meshed with the gear 19, the gear 19 is in turn secured to the yokes 6, and the yokes 6 are made integral with the outer portion of the said slides 39. The screws 5 are operatively positioned in the posts 4 on the thread 41, the screws 5 are in turn operatively positioned in the bearings 7, the spiders 18 are secured on the screws 5 adjacent to the outer portion of the said bearings 7, the arm 20 is in turn secured to the outer shell of the said bearing 8 and operatively forms a contact with the said spiders 18. The gears 16 are secured on the said screws 5 in line with the gear 13, the levers 23 are operatively positioned on the outer-end portions of the screws 5, and the arms 21 are made integral with the outer portion of the said yokes 6, the slots 22 pass radially thru the outer portion of the arms 21 around the center of the screws 5, to operatively receive the pins 24, the said pins 24 are secured in the levers 23, and operatively hold the gears 17 to open or close mesh with the said gear 13, and to stay meshed with the gears 16.

The arms 36 are shown in Figure 3 with the inner ends of the shafts 37 pointing to the center of the bore 1 and core 2 on two center lines with a clearance space between the two lines of cutters 3, and the shafts 37 are tilted at predetermined angles from the longitudinal line of the posts 4 as shown in Figure 1, with the center cutters 3 on the said shafts 37 extended into a point 42.

To operate the machine the cylinder 26 is first placed on the rails 30, and anchored in the bore 1 by the clamps 28, the edges 33, 33$^a$ or 33$^b$ on the cutters 3, 3$^a$ or 3$^b$ respectively are then made to bear on the surfaces 31, the motor 25 is then set into motion to turn the frame 29 and yokes 6 thereon, by transmitting the power thru the gears 13 and 14, shaft 40, and gears 15 and 19 respectively. The frame 29 turns in the cylinder 26 by rolling on the wheels 12 over the rails 27, and is in turn held in its longitudinal position within the said cylinder 26 by rolling on the wheels 11, over the said rails 27. To remove the solid rock or other materials in the bore 1, the edges 33, 33$^a$ or 33$^b$ on the cutters 3, 3$^a$ or 3$^b$ are fed into the surfaces 31, as the frame 29 turns in the cylinder 26, by advancing the posts 4 thru the slides 39 on the screws 5, by striking the arms of the spiders 18 against the arm 20 to turn the said screws 5 in their bearings 7 and threads 41 respectively. The materials cut from the surfaces 31 are then conveyed from the bore 1 by a mechanical or hydraulic means, not shown, thru the space 32 for disposal.

After the posts 4 have been advanced towards the surfaces 31 to the length of the screws 5, a new cutting position will be necessary, thus to resume a new cutting operation the gear 15 is first removed out of mesh with the gear 19, the posts 4 are in turn withdrawn from the surfaces 31 by reversing the rotation of the screws 5, by throwing the gear 17 into mesh with the gear 13 by the lever 23, the motor 25 is again set into motion and the power is transmitted therefrom thru the gears 13, 17 and 16 respectively, to the screws 5 as hereinbefore described.

When the posts 4 have been withdrawn from the said surfaces 31 to their desired position for the new cutting position, the apparatus may be advanced further into the bore 1, and around the core 2, by moving the cylinder 26 on the rails 30, and the cutting operation thru the surfaces 31 may be repeated.

When the core 2 attains a length convenient for handling it may be broken off for its disposal.

The hollow 34 in the cutter 3$^b$ is best adapted to roll the edge 33$^b$ into the line 42, on a line parallel with the center line of the posts 4, when in its angular position as shown in Figure 6; the flat face 35 in the cutter 3$^a$ is also best adapted to roll the edge 33$^a$ into the bevel surface 31, on a line parallel with the center line of the said posts 4, when in its angular position; and the diamond edge 33 in the cutter 3 will trim the sides of the bore 1 and core 2 without binding on the sides thereof, when being fed into the surface 31 on a line parallel with the center line of the said posts 4.

When the edges 33, 33$^a$ and 33$^b$ are fed into the surface 31, a new surface line 31 will be reached, after the stone or other material has been broken away, as illustrated in Figures 5 and 6, by wedging thru the said surfaces 31 with a rolling motion, and forcing the loose and broken materials therefrom.

Having thus fully described my invention, I claim as new and desire to secure by Letters Patent—

1. In an apparatus for cutting rock, the combination of a supporting frame, adapted to be secured over the surface of the said rock, a revolving frame operatively positioned in the said supporting frame, a tool post operatively positioned in the said revolving frame, a power transmission means, adapted to guide and feed the said tool post, a plurality of rotary cutters in the said tool post, adapted to break away and remove the said rock, as set forth.

2. In an apparatus for cutting rock, the combination of a supporting frame, adapted to be secured in a bore or tunnel, a revolving frame operatively positioned in the said supporting frame, a plurality of tool posts operatively positioned in the said revolving frame, a power transmission means, adapted to turn the said revolving frame, and feed the said tool posts, a plurality of rotary cutters operatively positioned on the said tool posts at predetermined angles, adapted to break away and remove the said rock, as set forth.

3. In a tunnel boring machine, the combination of a cylinder, adapted to be secured in the bore of a tunnel, a frame operatively positioned in the said cylinder, around a central core, a power transmission means, adapted to revolve the said frame, a plurality of tool posts operatively positioned in the said frame, a feeding means, adapted to operate the said tool posts, cutter heads positioned on the said tool posts, a plurality of rotary cutters, adapted to be positioned at predetermined angles bearing radially towards the center of the said bore and core, and also tilted at predetermined angles from the longitudinal line of the said tool posts, as set forth.

In testimony whereof I affix my signature.

ANTHONY E. CARLSON.